US006904356B2

(12) United States Patent
Uchida et al.

(10) Patent No.: US 6,904,356 B2
(45) Date of Patent: Jun. 7, 2005

(54) APPARATUS AND METHOD FOR ESTIMATING INTERNAL EGR AMOUNT IN INTERNAL COMBUSTION ENGINE

(75) Inventors: Takefumi Uchida, Toyota (JP);
Harufumi Muto, Ann Arbor, MI (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/778,542

(22) Filed: Feb. 17, 2004

(65) Prior Publication Data

US 2004/0220718 A1 Nov. 4, 2004

(30) Foreign Application Priority Data

Feb. 19, 2003 (JP) ...................................... 2003-041741

(51) Int. Cl.[7] ................................................. B60T 7/12
(52) U.S. Cl. .............. 701/108; 123/568.14; 123/568.21
(58) Field of Search ..................... 701/108; 123/568.14, 123/568.21

(56) References Cited

U.S. PATENT DOCUMENTS

| | | | | |
|---|---|---|---|---|
| 6,601,563 | B2 * | 8/2003 | Funke et al. ................. | 123/321 |
| 6,609,493 | B2 * | 8/2003 | Yamaguchi et al. ......... | 123/299 |
| 6,640,771 | B2 * | 11/2003 | Fuerhapter ................... | 123/295 |
| 6,722,349 | B2 * | 4/2004 | Leman et al. ........... | 123/568.14 |
| 6,840,235 | B2 * | 1/2005 | Koseki et al. .......... | 123/568.14 |
| 2003/0106530 | A1 * | 6/2003 | Kitajima et al. ........ | 123/406.48 |
| 2004/0168680 | A1 * | 9/2004 | Ishiguro et al. ......... | 123/568.21 |
| 2004/0230364 | A1 * | 11/2004 | Uchida et al. .............. | 701/101 |

FOREIGN PATENT DOCUMENTS

| JP | A 2001-221105 | 8/2001 |
|---|---|---|
| JP | A 2002-227687 | 8/2002 |

* cited by examiner

Primary Examiner—John T. Kwon
(74) Attorney, Agent, or Firm—Oliff & Berridge, PLC

(57) ABSTRACT

An electronic control unit of an internal combustion engine computes a remaining combusted gas amount $M_{egr1}$, which exists in a cylinder immediately before an intake valve is opened, based on an intake pipe pressure Pm, an engine speed NE, and an intake valve opening timing $T_{open}$. At the same time, the control unit computes a backflow combusted gas amount $M_{egr2}$, which is the amount of combusted gas that flows back into the cylinder from an exhaust pipe after the intake valve is opened, based on the intake pipe pressure Pm, the engine speed NE and a valve overlap amount OL. The control unit computes the sum of the remaining combusted gas amount $M_{egr1}$ and the backflow combusted gas amount $M_{egr2}$, and sets the sum as an estimated internal EGR amount $M_{egrALL}$. As a result, the internal EGR amount is readily and accurately estimated.

16 Claims, 4 Drawing Sheets

(Exhaust of Combusted Gas)

(Immediately Before Intake Valve Is Opened)

(Valve Overlap)

($\mu iAi \leq \mu eAe$)

($\mu eAe < \mu iAi$)

APPARATUS AND METHOD FOR ESTIMATING INTERNAL EGR AMOUNT IN INTERNAL COMBUSTION ENGINE

BACKGROUND OF THE INVENTION

The present invention relates to an apparatus and a method for estimating the amount of exhaust gas recirculation that is present in an internal combustion engine, or an internal EGR amount of an internal combustion engine.

Some of combusted gas in a typical internal combustion engine remains in a cylinder. The remaining combusted gas is referred to as internal EGR. Since internal EGR affects the combustion state and the emission of the engine, the amount of internal EGR is estimated and, based on the estimation, the amount of intake air, the ignition timing, the amount of injected fuel, and the fuel injection timing are adjusted. In an internal combustion engine having a variable valve actuation mechanism, the amount of exhaust gas that returns to the cylinder from the exhaust system is changed according to changes in, for example, the amount of valve overlap. The amount of internal EGR is changed accordingly. Valve overlap refers to a state where an intake valve and an exhaust valve are open at the same time. A valve overlap amount refers to a period in which valve overlap occurs in terms of an angle of a crankshaft, which is an output shaft of an internal combustion engine.

Accordingly, apparatuses for estimating the amount of internal EGR have been proposed. Japanese Laid-Open Patent Publication No. 2001-221105 discloses such an apparatus. The apparatus of the publication estimates the amount of internal EGR in consideration of changes in the amount of valve overlap based on the engine speed, the amount of valve overlap, the closing timing of the exhaust valves, and the intake pressure. Specifically, based on the closing timing of the exhaust valve and the engine speed, the apparatus first computes the amount of internal EGR during a period in which there is no valve overlap. Thereafter, the apparatus corrects the computed value based on the period of the valve overlap and the intake pressure, thereby estimating the amount of internal EGR.

The logic used in the above apparatus for estimating an internal EGR amount is not based on the physical behavior of combusted gas in actual internal combustion engines. This complicates the estimation logic. For example, equations and conditions for estimation must be changed according to various parameters such as the state of valve overlap and the closing timing of the exhaust valve. The estimation logic is particularly complicated when applied to an engine having a variable valve actuation mechanism of a high flexibility of control, which, for example, independently controls the valve timing of each of the intake and exhaust valves. If the estimation logic is complicated, the number of necessary parameters and the number of corrections based on the parameters are increased. Errors contained in the parameters and the corrections are accumulated and, as a result, degrade the accuracy of the estimation of the internal EGR amount.

SUMMARY OF THE INVENTION

Accordingly, it is an objective of the present invention to provide an apparatus and a method for estimating the amount of internal EGR in an internal combustion engine, which apparatus is capable of easily and accurately estimating an internal EGR amount.

To achieve the foregoing and other objectives and in accordance with the purpose of the present invention, an apparatus for estimating an internal EGR amount of an internal combustion engine is provided. The engine includes a cylinder accommodating a piston, an intake passage and an exhaust passage connected to the cylinder, an intake valve for selectively connecting and disconnecting the intake passage with the cylinder, and an exhaust valve for selectively connecting and disconnecting the exhaust passage with the cylinder. The internal EGR amount is the amount of combusted gas that exists in the cylinder when air-fuel mixture is combusted in the cylinder. The apparatus includes a computer that computes the internal EGR amount as the sum of a remaining combusted gas amount and a backflow combusted gas amount. The remaining combusted gas amount is the amount of combusted gas that exists in the cylinder immediately before the intake valve is opened. The backflow combusted gas amount is the amount of combusted gas that flows back into the cylinder from the exhaust passage after the intake valve is opened.

The present invention also provides a method for estimating an internal EGR amount of an internal combustion engine. The engine includes a cylinder accommodating a piston, an intake passage and an exhaust passage connected to the cylinder, an intake valve for selectively connecting and disconnecting the intake passage with the cylinder, and an exhaust valve for selectively connecting and disconnecting the exhaust passage with the cylinder. The internal EGR amount is the amount of combusted gas that exists in the cylinder when air-fuel mixture is combusted in the cylinder. The method includes: computing a remaining combusted gas amount, which is the amount of combusted gas that exists in the cylinder immediately before the intake valve is opened; computing a backflow combusted gas amount, which is the amount of combusted gas that flows back into the cylinder from the exhaust passage after the intake valve is opened; and computing the internal EGR amount as the sum of the remaining combusted gas amount and the backflow combusted gas amount.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 1A to 5 are drawings for explaining the principle of the present invention, wherein:

FIGS. 1A to 1C are diagrammatic views illustrating behavior of combusted gas in an internal combustion engine;

FIG. 2 is a diagram showing backflow of combusted gas from an exhaust pipe;

FIG. 4 is a graph showing changes in the valve lift of an intake valve and an exhaust valve;

FIG. 5 is a graph showing an example of a function $f_3$ (NE, Pm);

DETAILED DESCRIPTION OF THE PREFERRED EMBODIMENTS

Principle of Invention

The principle of estimation of an internal EGR amount will be explained with reference to FIGS. 1A to 5, on which principle an apparatus for estimating an internal EGR amount of an internal combustion engine according to the present invention operates.

Combustion of fuel in the cylinder produces combusted gas. The combusted gas is exhausted to an exhaust pipe when an exhaust valve opens (see FIG. 1A). Thereafter, the intake valve is opened so that valve overlap is started. Due to the difference between a pressure Pe in the exhaust pipe and a pressure Pm in the intake pipe, some of the combusted gas flows back to the cylinder from the exhaust pipe (see FIG. 1C). At this time, some of the combusted gas flows through the cylinder and enters the intake pipe. This portion of the combusted gas will be drawn into the cylinder together with new air in the subsequent intake stroke. In this description, part of combusted gas that flows back to the cylinder from the exhaust pipe during valve overlap after the intake valve is opened is referred to as backflow combusted gas. The amount of backflow combusted gas is referred to as backflow combusted gas amount $M_{egr2}$.

Figure 1A:
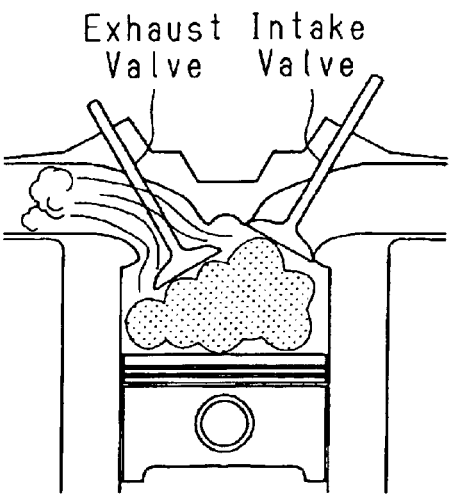
Figure 1B:
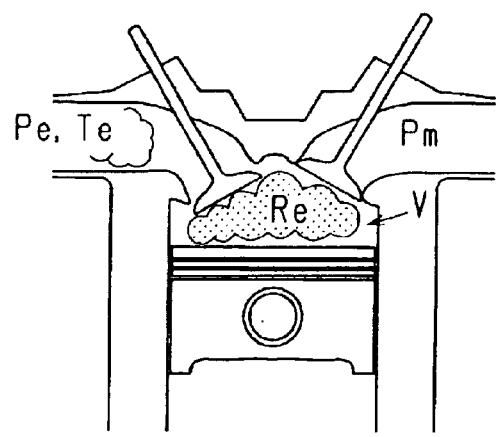
Figure 1C:
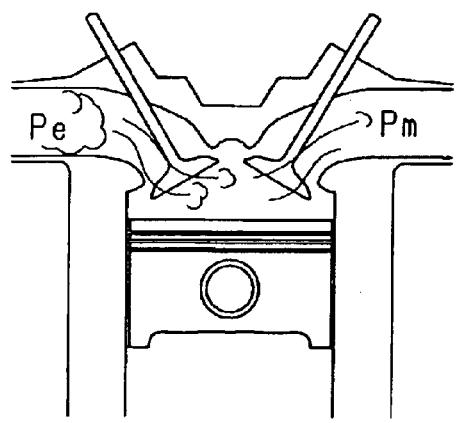
Figure 2:
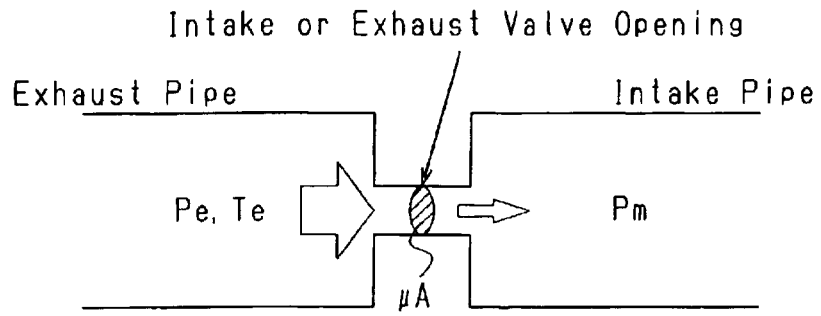

On the other hand, immediately before the intake valve is opened, some of combusted gas remains in the cylinder without being discharged to the exhaust pipe (see FIG. 1B). A portion of the remaining combusted gas continues staying in the cylinder, while the remainder, due to a backflow of exhaust, temporarily flows back into the intake pipe during valve overlap, and is then drawn into the cylinder again during the subsequent intake stroke. Therefore, the entire portion of the combusted gas that remains in the cylinder until immediately before opening of the intake valve will exist in the cylinder in the subsequent combustion. The part of combusted gas that remains in the cylinder immediately before opening of the intake valve is referred to as remaining combusted gas. The amount of the remaining combusted gas is referred to as remaining combusted gas amount $M_{egr1}$.

Accordingly, the internal EGR amount, which exists in the cylinder in a combustion, is estimated by the following equation (1). In the equation (1), the estimated internal EGR amount is represented by $M_{egrALL}$. The estimated internal EGR amount $M_{egrALL}$ is expressed as the sum of the remaining combusted gas amount $M_{egr1}$ and the backflow combusted gas amount $M_{egr2}$.

$$M_{egrALL} = M_{egr1} + M_{egr2} \tag{1}$$

1. Computation of Remaining Combusted Gas Amount $M_{egr1}$

The remaining combusted gas amount $M_{egr1}$ is expressed by the following equation (2), which is a gas state equation based on the state in the cylinder immediately before the intake valve is opened. In the equation (2): Pm represents the pressure in the intake pipe; Pe represents the pressure in the exhaust pipe; Re represents the gas constant of the combusted gas; Te represents the exhaust temperature (the temperature of combusted gas passing through the exhaust pipe, or the temperature of exhaust gas); V represents the volume of the cylinder immediately before the intake valve is opened.

$$M_{egr1} = \frac{Pe \cdot V}{Re \cdot Te} \tag{2}$$

The cylinder volume V immediately before the intake valve is open is computed by the following equation (3) based on the timing of opening of the intake valve $T_{open}$ (BTDC), the bore diameter $r_b$ of the cylinder, the stroke S of the piston, and the volume of the combustion chamber when the piston is at the top dead center, or the clearance volume Vc.

$$V = Vc + \pi \frac{r_b^2}{4} \frac{S}{2} \{1 - \sin(T_{open})\} = f_2(T_{open}) \tag{3}$$

In the equation (3), the cylinder bore diameter $r_b$, the stroke S, and the clearance volume Vc are constants that are determined by design dimensions. Therefore, in the case of an internal combustion engine having a variable valve actuation mechanism that changes the valve timing of the intake valve, the cylinder volume V is computed as a function $f_2(T_{open})$ of the intake valve opening timing $T_{open}$ ($V = f_2(T_{open})$).

2. Computation of Backflow combusted gas amount $M_{egr2}$

During valve overlap, due to the difference between the exhaust pipe pressure Pe and the intake pipe pressure Pm, combusted gas flows from the exhaust pipe to the intake pipe. That is, the combusted gas from the exhaust pipe flows through the cylinder. In this state, in the path of the combusted gas, the opening between the intake pipe and the cylinder defined by the intake valve (the intake valve opening) and the opening between the exhaust pipe and the cylinder (the exhaust valve opening) function as restrictions each having a reduced area. Therefore, the behavior of the combusted gas flow is expressed by a diagram of FIG. 2. The flow rate Q of combusted gas can be computed using an equation for computing the flow rate at the sections of the restrictions.

The following equation (4) is used as the equation for computing the flow rate at the restriction. In the equation (4): κ represents the ratio of specific heat of combusted gas, μ represents the flow coefficient, and A represents the opening area of the valve.

$$Q = \mu A \frac{Pe}{\sqrt{Re \cdot Te}} \Phi\left(\frac{Pm}{Pe}\right) \tag{4}$$

When an inequality $1/(\kappa+1) < Pm/Pe$ is satisfied, $\Phi(Pm/Pe)$ in the equation (4) is represented by the following equation (5).

$$\Phi\left(\frac{Pm}{Pe}\right) = \sqrt{\left\{\frac{\kappa-1}{2\kappa} \cdot \left(1 - \frac{Pm}{Pe}\right) + \frac{Pm}{Pe}\right\} \cdot \left(1 - \frac{Pm}{Pe}\right)} \tag{5}$$

When an inequality $1/(\kappa+1) \geq Pm/Pe$ is satisfied, $\Phi(Pm/Pe)$ in the equation (4) is represented by the following equation (6).

$$\Phi\left(\frac{Pm}{Pe}\right) = \sqrt{\frac{\kappa}{2(\kappa+1)}} \tag{6}$$

Therefore, the amount of combusted gas that is drawn back into the cylinder, or the backflow combusted gas amount $M_{egr2}$, can be computed as a time integral of the flow rate of combusted gas at the restriction during valve overlap. Since the intake pipe pressure Pm, the exhaust pipe pressure Pe, the exhaust temperature Te, and the ratio of specific heat κ are not abruptly changed, these values are assumed to be substantially constant during valve overlap. Therefore, the backflow combusted gas amount $M_{egr2}$ is computed as a value that is in proportion to the time integral $\Sigma(\mu A)$ of an effective valve opening area μA (μA=flow constant μ×valve opening area A). Thus, the backflow combusted gas amount $M_{egr2}$ can be expressed by the following equation (7).

$$M_{egr2} = \sum (\mu A) \cdot \frac{Pe}{\sqrt{Re \cdot Te}} \cdot \Phi\left(\frac{Pm}{Pe}\right) \tag{7}$$

Figure 3A:
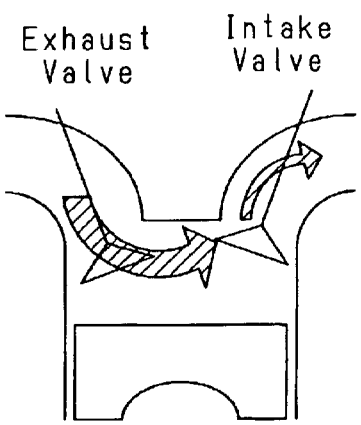
FIGS. 3A and 3B are diagrammatic views showing the behavior of combusted gas that flows back from an exhaust pipe.
Figure 3B:
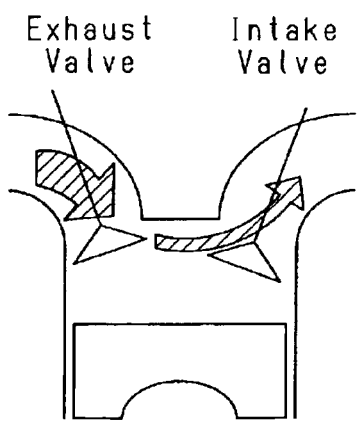
Figure 4:
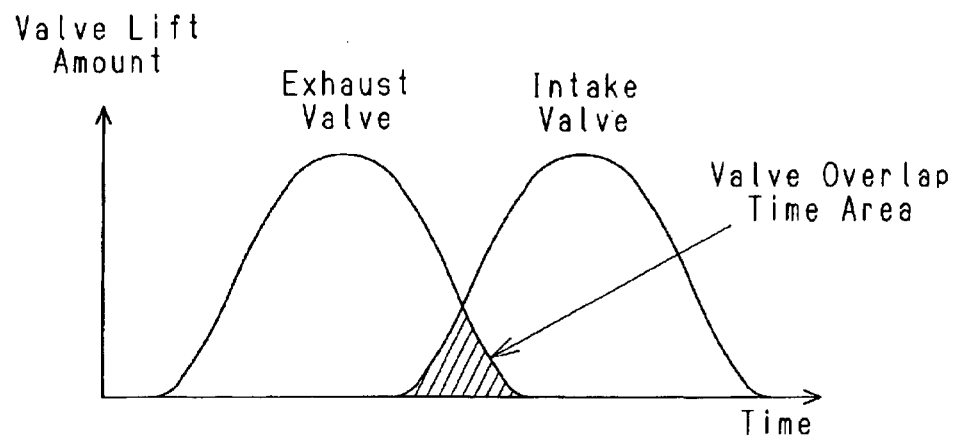

2-1. Computation of Time Integral $\Sigma(\mu A)$ of Effective Valve Opening Area When exhaust flows back during valve overlap, if the effective valve opening area $\mu_i A_i$ of the intake valve is less than the effective valve opening area $\mu_e A_e$ of the exhaust valve as shown in FIG. 3A, the intake valve functions as a restriction. If the effective valve opening area $\mu_e A_e$ of the exhaust valve is less than the effective opening area $\mu_i A_i$ of the intake valve as shown in FIG. 3B, the exhaust valve functions as a restriction. In short, one of the exhaust valve and the intake valve that has a smaller effective valve opening are μA functions as a restriction. Thus, the time integral $\Sigma(\mu A)$ of the effective valve opening area (effective restriction opening area) is expressed by the following equation (8). The time integral $\Sigma(\mu A)$ is a time integral during valve overlap.

$$\sum (\mu A) = \sum_{\mu_e A_e < \mu_i A_i} (\mu_e A_e) + \sum_{\mu_i A_i \le \mu_e A_e} (\mu_i A_i) \tag{8}$$

On the assumption that the flow coefficient μ of the intake valve is the same as that of the exhaust valve ($\mu_i = \mu_e = \mu$), the equation (8) can be altered to the following equation (9). In the equation (9), the formula in the parentheses on the right side represents the area of a hatched section of valve overlap defined by valve lift curves in FIG. 4, or an valve overlap time area AOL.

$$\sum (\mu A) = \mu \left( \sum_{A_e < A_i} A_e + \sum_{A_i \le A_e} A_i \right) \tag{9}$$

In the case of an internal combustion engine having a variable valve actuation mechanism that changes the opening and closing timing of the intake valve and/or the exhaust valve, or the valve timing, the valve overlap time area is changed according to the settings of the valve timing of the intake and exhaust valves. Since the instantaneous values of the effective valve opening area μA is determined by design dimensions such as the cam profile, the time integral $\Sigma(\mu A)$ is computed as a function of the valve overlap amount OL of the intake and exhaust valves and the engine speed NE. That is, the valve overlap amount OL is the period of valve overlap expressed in units of rotation angle (crank angle) of the crankshaft, which is the output shaft of the engine. Therefore, if the effective valve opening area μA is integrated with respect to the crank angle, a function $f_1(OL)$, which is only related to the valve overlap amount OL, is obtained. Then, if the crank angle integration is divided by the engine speed NE, the valve overlap time area, or the time integral $\Sigma(\mu A)$ of the effective valve opening area, is obtained. Therefore, the equation (9) can be altered to the following equation (10). If the equation (10) is substituted into the equation (7), the following equation (11) is obtained.

$$\sum (\mu A) = \frac{f_1(OL)}{NE} \tag{10}$$

$$M_{egr2} = \frac{f_1(OL)}{NE} \times \frac{Pe}{\sqrt{Re \cdot Te}} \cdot \Phi\left(\frac{Pm}{Pe}\right) \tag{11}$$

3. Computation of Internal EGR Amount $M_{egrALL}$

The internal EGR amount $M_{egrALL}$ that exists in the cylinder during combustion is the sum of the remaining combusted gas amount $M_{egr1}$ expressed by the equation (2) and the backflow combusted gas amount $M_{egr2}$ expressed by the equation (11). That is, the internal EGR amount $M_{egrALL}$ is expressed by the following equation (12).

$$M_{egrALL} = \frac{Pe}{Re \cdot Te} \times f_2(T_{open}) + \frac{f_1(OL)}{NE} \times \frac{Pe}{\sqrt{Re \cdot Te}} \cdot \Phi\left(\frac{Pm}{Pe}\right) \tag{12}$$

The exhaust pipe pressure Pe and the exhaust temperature Te can be estimated from the running state of the engine. That is, the exhaust pipe pressure Pe and the exhaust temperature Te are computed as functions of the engine speed NE and the engine load. Therefore, if the exhaust pipe pressure Pe and the exhaust temperature Te are not measured or estimated, these values can be obtained as functions of the engine speed NE and a parameter representing the engine load such as an engine load ratio (the ratio of the current load to the maximum load (WOT)), an intake air amount GA, and the intake pipe pressure Pm.

Figure 5:
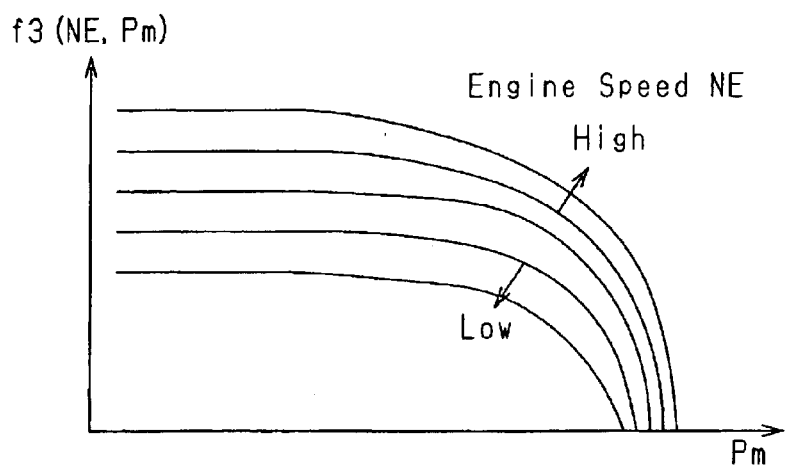

If the intake pipe pressure Pm is used as an indicator of the engine load, the equation (11) can be expressed as the following equation (13), which is a function of the valve overlap amount OL, the engine speed NE, and the intake pipe pressure Pm. FIG. 5 shows an example of the settings of such a function $f_3$ (NE, Pm).

$$M_{egr2} = \frac{f_1(OL)}{NE} \times f_3(NE, Pm) \tag{13}$$

If (Pe/(Re·Te)) in the equation (2) is expressed as a function $f_4$ (NE, Pm) of the engine speed NE and the intake pipe pressure Pm, the remaining combusted gas amount $M_{egr1}$ is expressed by the following equation (14).

$$M_{egr1} = f_4(NE, Pm) \times f_2(T_{open}) \tag{14}$$

In this case, the internal EGR amount $M_{egrALL}$ is expressed by the following equation (15), or a function of the engine speed NE, the intake pipe pressure Pm, the valve overlap amount OL, and the intake valve opening timing $T_{open}$.

$$M_{egrALL} = f_4(NE, Pm) \times f_2(T_{open}) + \frac{f_1(OL)}{NE} \times f_3(NE, Pm) \tag{15}$$

EMBODIMENTS OF INVENTION

Based on the above principles, an apparatus for estimating an internal EGR amount according to one embodiment of the present invention will now be described with reference to FIGS. 6 to 8.

Figure 6:
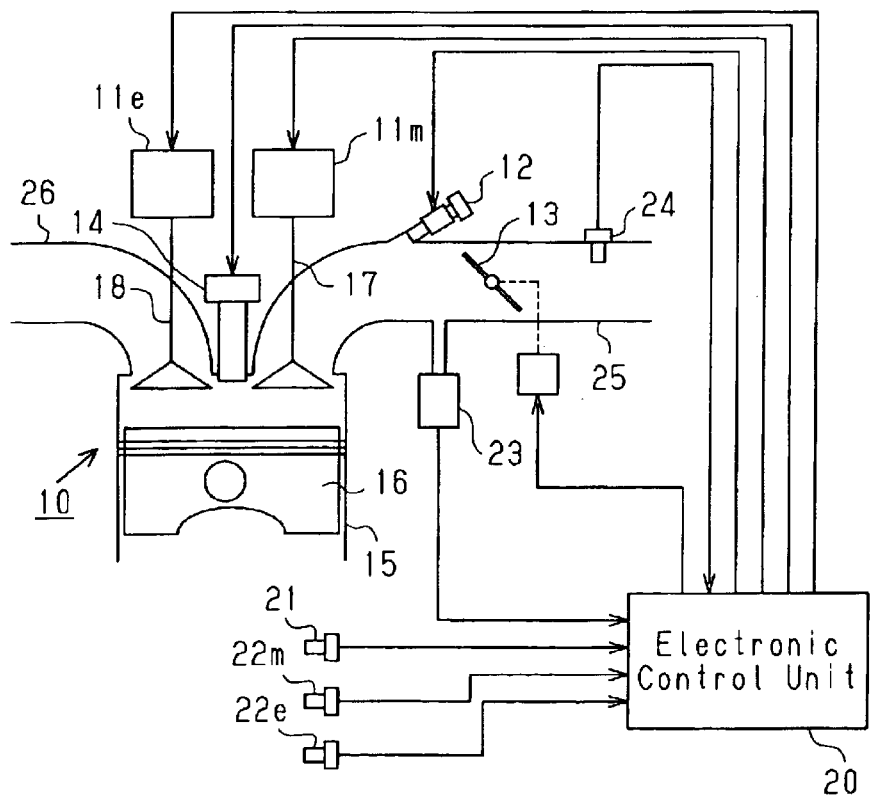
FIG. 6 is a diagrammatic view showing an overall configuration of one embodiment according to the present invention.
Figure 7:
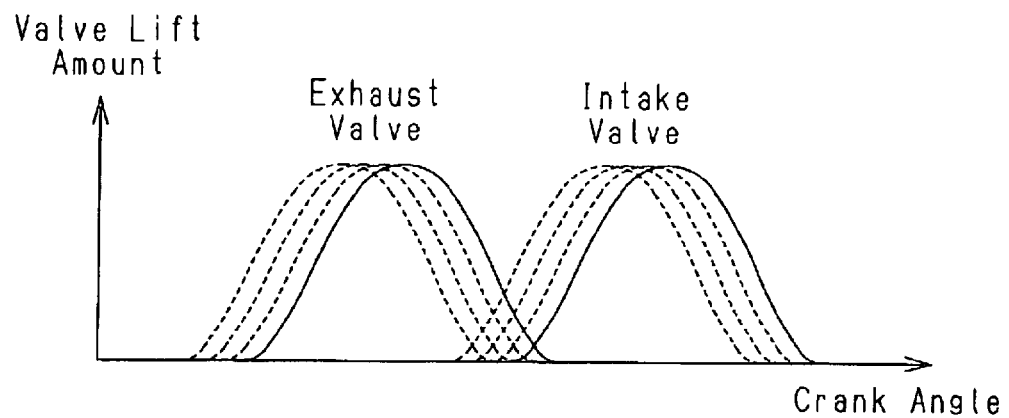
FIG. 7 is a graph showing a control of the valve timing of the engine shown in FIG. 6.

As shown in FIG. 6, the apparatus for estimating an internal EGR amount according to this embodiment is applied to an internal combustion engine 10. The engine 10 includes one or more cylinders 15, each of which accommodates a piston 16, and at least a pair of intake and exhaust valves 17, 18. One of the intake valves 17 and one of the exhaust valves 18 correspond to each of the cylinders 15. An intake pipe (intake passage) 25 is coupled to the cylinder 15. The intake valve 17 selectively connects and disconnects the intake pipe 25 with the cylinder 15. An exhaust pipe (exhaust passage) 26 is coupled to the cylinder 15. The exhaust valve 18 selectively connects and disconnects the exhaust pipe 26 with the cylinder 15. The engine 10 also includes a variable valve actuation mechanism 11m for varying the valve timing of the intake valve 17 and a variable valve actuation mechanism 11e for varying the valve timing of the exhaust valve 18. The apparatus includes an electronic control unit 20 as a main component. The electronic control unit 20 performs various controls of the engine 10. The electronic control unit 20 is a controller including a computer.

The engine 10 has various sensors that detect the running state of the engine 10. For example, a crank angle sensor 21 is provided in the vicinity of a crankshaft, which is an output shaft of the engine 10. Cam angle sensors 22m, 22e are provided in the vicinity of an intake camshaft and an exhaust camshaft, respectively. Further, an intake pressure sensor 23 and an air flow meter 24, which is a flow rate sensor, are provided in the intake pipe 25.

The electronic control unit 20 monitors the running state of the engine 10 based on detected signals of the sensors. For example, the rotational phase of the crankshaft, or the crank angle, is obtained from detected signals of the crank angle sensor 21. The engine speed NE is also obtained from signals from the crank angle sensor 21. Rotational phases of the intake camshaft and the exhaust camshaft, or cam angles, are obtained from detected signals of the cam angle sensors 22m, 22e. Further, the pressure Pm in the intake pipe 25 is obtained from detected signals of the intake pressure sensor 23, and the intake air amount GA is obtained from detected signals of the air flow meter 24.

Based on the running state of the engine 10, which is monitored based on the detection results of the sensors, the electronic control unit 20 performs various controls of the engine 10. For example, the electronic control unit 20 outputs command signals to an injector 12, an ignition plug 14, and a throttle valve 13 of the engine 10 according to the running state of the engine 10, thereby controlling fuel injection, ignition timing, and the amount of intake air.

Also, the electronic control unit 20 controls the valve timing of the intake and exhaust valves 17, 18 in the following manner. That is, the electronic control unit 20 outputs command signals that correspond to the running state of the engine 10 to the variable valve actuation mechanisms 11m, 11e. The variable valve actuation mechanisms 11m, 11e change the rotational phases of the intake camshaft and the exhaust camshaft relative to the rotation phase of the crankshaft in response to command signals from the electronic control unit 20. Accordingly, the opening and closing timings of the intake valve 17 and the exhaust valve 18, or valve timings, are varied in accordance with the running state of the engine 10 as shown in FIG. 7.

As the variable valve actuation mechanisms 11m, 11e change the valve timings of the intake valve and the exhaust valve 17, 18, the amount of internal EGR amount that exists in the combustion chamber in the cylinder 15 during combustion is greatly varied. For example, as the valve overlap of the intake and exhaust valves 17, 18 is increased, the internal EGR amount is increased. Even if the valve overlap is constant, the internal EGR amount is changed as the time at which the valve overlap is started, or the time at which the intake valve 17 starts opening, is changed. Further, the internal EGR amount is changed according to the running state of the engine 10, such as the engine speed NE and the engine load.

Changes in the internal EGR amount affects the combustion state of the engine 10. Thus, the ignition timing is adjusted according to changes in the internal EGR amount so that the combustion state of the engine 10 is optimized.

The internal EGR amount must be accurately monitored when adjusting the ignition timing. When computing the ignition timing, the electronic control unit 20 estimates the internal EGR amount in the following manner.

Figure 8:
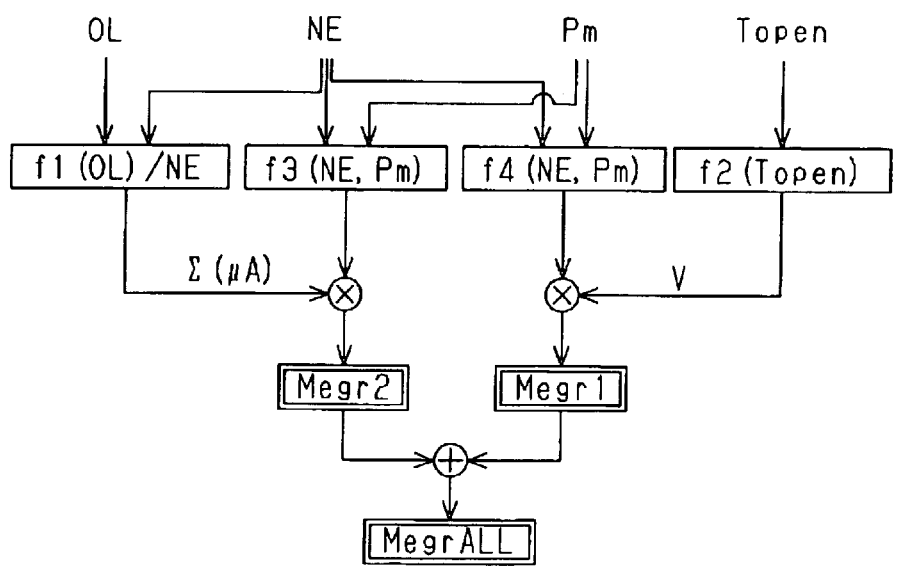
FIG. 8 is a block diagram showing a computation logic for estimating an internal EGR amount in the embodiment of FIG. 6.

FIG. 8 is a block diagram showing a logic for computing the internal EGR amount $M_{egrALL}$ used in estimation of the internal EGR amount. Using the equation (15), the internal EGR amount $M_{egrALL}$ is estimated.

Specifically, the engine speed NE detected by the crank angle sensor 21, and the intake pipe pressure Pm detected by the intake pressure sensor 23 are received by the electronic control unit 20. Based on detection results of the cam angle sensors 22m, 22e, the valve overlap amount OL of the intake and exhaust valves 17, 18 and the intake valve opening timing $T_{open}$ are computed.

Using the engine speed NE and the function $f_1$ (OL) of the valve overlap amount OL, the time integral $\Sigma(\mu A)$ of the effective valve opening area is computed using the equation (10). Using the time integral $\Sigma(\mu A)$ and the function $f_3$ (NE, Pm) of the engine speed NE and the intake pipe pressure Pm, a backflow gas amount $M_{egr2}$ is computed using the equation (13).

At the same time, based on the function $f_2$ ($T_{open}$) shown in the equation (3), the cylinder volume V when the intake valve 17 is opened is computed from the computed intake valve opening timing $T_{open}$. Further, using the function $f_4$ (NE, Pm) of the engine speed NE and the intake pipe pressure Pm, and the computed cylinder volume V, the remaining combusted gas amount $M_{egr1}$ is computed using the equation (14).

In this embodiment, the internal EGR amount $M_{egrALL}$ is computed as the sum of the remaining combusted gas amount $M_{egr1}$ and the backflow combusted gas amount $M_{egr2}$. Based on the internal EGR amount $M_{egrALL}$, values used in correction of parameters such as the ignition timing are computed.

This embodiment has the following advantages.

(1) In the illustrated embodiment, the internal EGR amount $M_{egrALL}$ is computed as the sum of the remaining combusted gas amount $M_{egr1}$ and the backflow combusted gas amount $M_{egr2}$. The remaining combusted gas amount $M_{egr1}$ is the amount of combusted gas that exists in the cylinder 15 before the intake valve 17 is opened. The backflow combusted gas amount Megr2 is the amount of combusted gas that flows back into the cylinder 15 from the exhaust pipe 26 after the intake valve 17 is opened. Therefore, based on the actual behavior of the combusted gas in the engine 10, the internal EGR amount $M_{egrALL}$ is accurately estimated.

(2) In the illustrated embodiment, the remaining combusted gas amount $M_{egr1}$ is computed from a function that is expressed by the equation (14) based on the intake pipe pressure Pm, the engine speed NE, and the intake valve opening timing $T_{open}$. Therefore, the remaining combusted gas amount $M_{egr1}$ is accurately and easily computed.

(3) In the illustrated embodiment, the backflow combusted gas amount $M_{egr2}$ is computed from a function that is expressed by the equation (13) based on the intake pipe pressure Pm, the engine speed NE, and the valve overlap amount OL. Therefore, the backflow combusted gas amount $M_{egr2}$ is accurately and easily computed.

It should be apparent to those skilled in the art that the present invention may be embodied in many other specific forms without departing from the spirit or scope of the invention. Particularly, it should be understood that the invention may be embodied in the following forms.

In the illustrated embodiment, the exhaust temperature Te and the exhaust pipe pressure Pe are estimated from the engine speed NE and the intake pipe pressure Pm, and the remaining combusted gas amount $M_{egr1}$ and the backflow combusted gas amount $M_{egr2}$ are computed, accordingly. The exhaust pipe pressure Pe and the exhaust temperature Te may be estimated based on the engine load and the engine speed NE. Therefore, the exhaust pipe pressure Pe and the exhaust temperature Te can be estimated based on the engine speed NE and any of the control parameters indicating the engine load, which are, for example, the load ratio, the intake air amount, the fuel injection amount, the throttle opening amount, and the amount of manipulation of the acceleration pedal.

In the illustrated embodiment, the remaining combusted gas amount $M_{egr1}$ and the backflow combusted gas amount $M_{egr2}$ may be estimated by directly measuring or estimating the exhaust pipe pressure Pe and the exhaust temperature Te. For example, the remaining combusted gas amount $M_{egr1}$ can be computed using the equation (2) based on the exhaust pipe pressure Pe and the exhaust temperature Te. Likewise, the backflow combusted gas amount $M_{egr2}$ can be computed using the equation (11).

In the illustrated embodiment, to compute the backflow combusted gas amount $M_{egr2}$, the time integral $\Sigma(\mu A)$ of the effective valve opening area is computed using the equation (10) based on the valve overlap amount OL and the engine speed NE. That is, the valve overlap time area AOL is computed from the valve overlap amount OL and the engine speed NE, and the computed valve overlap time area is used as the time integral $\Sigma(\mu A)$ of the effective valve opening area. To compute the time integral $\Sigma(\mu A)$, the valve overlap area AOL may be obtained by a process other than the process described above.

In the illustrated embodiment, the opening of either the intake and exhaust valves is regarded as a restriction, and the flow rate at the restriction is computed using the equation (4). The backflow combusted gas amount $M_{egr2}$ is computed, accordingly. Equations other than the equation (4) are known to compute the flow rate at a restriction. The backflow combusted gas amount $M_{egr2}$ may be computed using any of such equations. In short, if the flow rate of combusted gas that flows back to the exhaust pipe during valve overlap is computed on the assumption that the opening of either of the intake and exhaust valves functions as a restriction, the backflow combusted gas amount $M_{egr2}$ can be computed.

The following equation (16) is an example of such equations for computing the flow rate at a restriction. The equation (16) can be applied to a case where combusted gas that flows back from the exhaust pipe to the cylinder can be regarded as incompressible fluid. In the equation (16): Q represents the flow rate of combusted gas that flows back to the cylinder from the exhaust pipe; $\mu$ represents the flow coefficient; A represents the effective opening area of the valve; Pe represents the exhaust pipe pressure; Pm represents the intake pipe pressure; and $\rho$ represents the density of combusted gas that flows back to the exhaust pipe to the cylinder.

$$Q = \mu A \sqrt{2\frac{Pe - Pm}{\rho}} \quad (16)$$

The density $\rho$ of the combusted gas can be expressed as a function of the exhaust temperature Te. Therefore, when the equation (16) is used, the flow rate of Q of combusted gas that flows back to the cylinder from the exhaust pipe can be computed as a function of the exhaust pipe pressure Pe, the exhaust temperature Te, the intake pipe pressure Pm, and the effective valve opening area $\mu A$. Thus, in this case, the backflow combusted gas amount $M_{egr2}$ can be computed using a function based on the exhaust pipe pressure Pe, the exhaust temperature Te, the intake pipe pressure Pm, and the time integral $\Sigma(\mu A)$ of the effective valve opening area. Also, the exhaust pipe pressure Pe and the exhaust temperature Te may be estimated from the engine speed NE and the engine load, and the backflow combusted gas amount $M_{egr2}$ may be computed based on a function based on the intake pipe pressure Pm, the engine load, the engine speed NE and the time integral $\Sigma(\mu A)$ of the effective valve opening area. Even in this case, the time integral $\Sigma(\mu A)$ of the effective valve opening area may be computed as a function of the valve overlap time area or a function of the engine speed NE and the valve overlap amount OL, which is expressed by the equation (10).

In the illustrated embodiment, the present invention is applied to the engine 10, in which the variable valve actuation mechanisms 11m, 11e vary the valve timings of the intake valve 17 and the exhaust valve 18, respectively. However, the present invention may be applied to an engine in which a single variable valve actuation mechanism is provided at either of the intake valve or the exhaust valve. Also, the present invention may be applied to an engine having other types of variable valve actuation mechanisms, such as a mechanism for varying valve lift. Alternatively, the present invention may be applied to an engine having no variable valve actuation mechanism. That is, regardless of the configuration of the engine, the present invention may be embodied in the same or a similar manner.

Therefore, the present examples and embodiments are to be considered as illustrative and not restrictive and the invention is not to be limited to the details given herein, but may be modified within the scope and equivalence of the appended claims.

What is claimed is:

1. An apparatus for estimating an internal EGR amount of an internal combustion engine, wherein the engine includes a cylinder accommodating a piston, an intake passage and an exhaust passage connected to the cylinder, an intake valve for selectively connecting and disconnecting the intake passage with the cylinder, and an exhaust valve for selectively connecting and disconnecting the exhaust passage with the cylinder, wherein the internal EGR amount is the amount of combusted gas that exists in the cylinder when air-fuel mixture is combusted in the cylinder, the apparatus comprising:

a computer that computes the internal EGR amount as the sum of a remaining combusted gas amount and a backflow combusted gas amount, wherein the remaining combusted gas amount is the amount of combusted gas that exists in the cylinder immediately before the intake valve is opened, and the backflow combusted gas amount is the amount of combusted gas that flows back into the cylinder from the exhaust passage after the intake valve is opened.

2. The apparatus according to claim 1, wherein the computer computes the remaining combusted gas amount according to a gas state equation based on a pressure in the exhaust passage, a temperature of exhaust gas, and a volume of the cylinder immediately before the intake valve is opened.

3. The apparatus according to claim 2, wherein the computer computes the volume of the cylinder immediately before the intake valve is opened as a function of opening timing of the intake valve.

4. The apparatus according to claim 1, wherein the computer computes the remaining combusted gas amount as a function of a speed of the engine, a load applied to the engine, and a volume of the cylinder immediately before the intake valve is opened.

5. The apparatus according to claim 4, wherein the computer computes the volume of the cylinder immediately before the intake valve is opened as a function of opening timing of the intake valve.

6. The apparatus according to claim 1, wherein the intake valve or the exhaust valve functions as a restriction in a path of combusted gas that flows back into the cylinder from the exhaust passage after the intake valve is opened, and wherein the computer computes the backflow combusted gas amount based on a flow rate of combusted gas at the restriction.

7. The apparatus according to claim 6, wherein one of the intake valve and the exhaust valve that has the smaller opening area functions as the restriction.

8. The apparatus according to claim 6, wherein the flow rate of the combusted gas at the restriction is expressed by an equation based on a pressure in the exhaust passage, a temperature of exhaust gas, a pressure in the intake passage, and an effective opening area of the restriction.

9. The apparatus according to claim 8, wherein the computer estimates the pressure in the exhaust passage and the temperature of exhaust gas based on a load applied to the engine and a speed of the engine.

10. The apparatus according to claim 1, wherein the computer computes the backflow combusted gas amount by using a function based on a pressure in the exhaust passage, a temperature of exhaust gas, a pressure in the intake passage, and a time integral of effective opening areas of the intake and exhaust valves.

11. The apparatus according to claim 10, wherein the time integral of the effective opening area is a time integral in a period during which the intake valve and the exhaust valve are both opened.

12. The apparatus according to claim 10, wherein the computer computes the time integral of the effective opening area as a function of a valve overlap amount and a speed of the engine, and wherein the valve overlap amount refers to a period during which the intake valve and the exhaust valve are both opened, which period is expressed in units of rotation angle of an output shaft of the engine.

13. The apparatus according to claim 1, wherein the computer computes the backflow combusted gas amount by using a function based on a pressure in the intake passage, a load applied to the engine, a speed of the engine, and a time integral of effective opening areas of the intake and exhaust valves.

14. The apparatus according to claim 13, wherein the time integral of the effective opening area is a time integral in a period during which the intake valve and the exhaust valve are both opened.

15. The apparatus according to claim 13, wherein the computer computes the time integral of the effective opening area as a function of a valve overlap amount and a speed of the engine, and wherein the valve overlap amount refers to a period during which the intake valve and the exhaust valve are both opened, which period is expressed in units of rotation angle of an output shaft of the engine.

16. A method for estimating an internal EGR amount of an internal combustion engine, wherein the engine includes a cylinder accommodating a piston, an intake passage and an exhaust passage connected to the cylinder, an intake valve for selectively connecting and disconnecting the intake passage with the cylinder, and an exhaust valve for selectively connecting and disconnecting the exhaust passage with the cylinder, wherein the internal EGR amount is the amount of combusted gas that exists in the cylinder when air-fuel mixture is combusted in the cylinder, the method comprising:

computing a remaining combusted gas amount, which is the amount of combusted gas that exists in the cylinder immediately before the intake valve is opened;

computing a backflow combusted gas amount, which is the amount of combusted gas that flows back into the cylinder from the exhaust passage after the intake valve is opened; and computing the internal EGR amount as the sum of the remaining combusted gas amount and the backflow combusted gas amount.

* * * * *